Sept. 14, 1965  F. J. LUKETA  3,205,605
REINFORCEMENT FOR PANEL PORTIONS OF A TRAWL NET
Filed Jan. 17, 1963  7 Sheets-Sheet 1
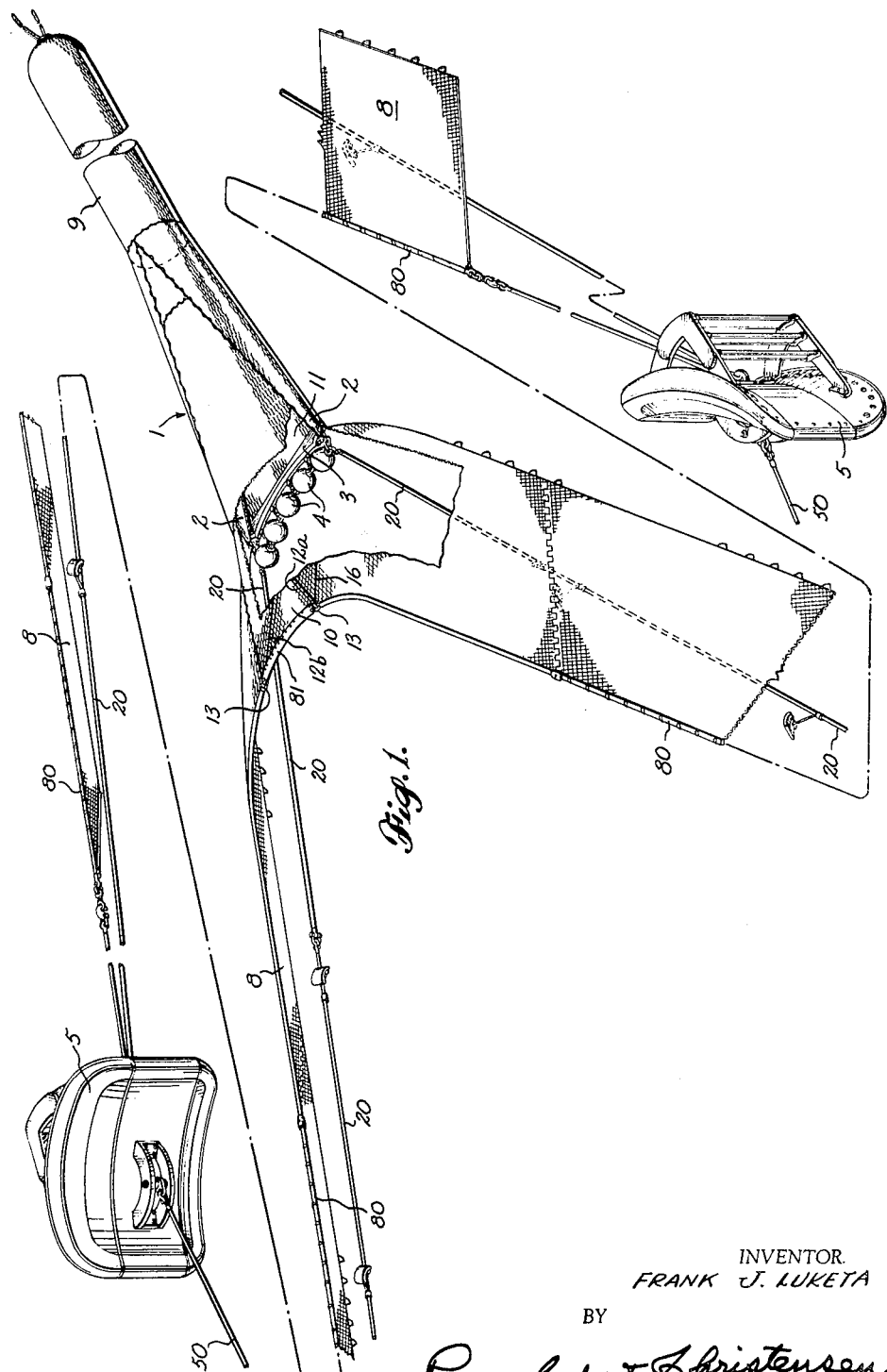
INVENTOR.
FRANK J. LUKETA
BY
Reynolds & Christensen
ATTORNEYS

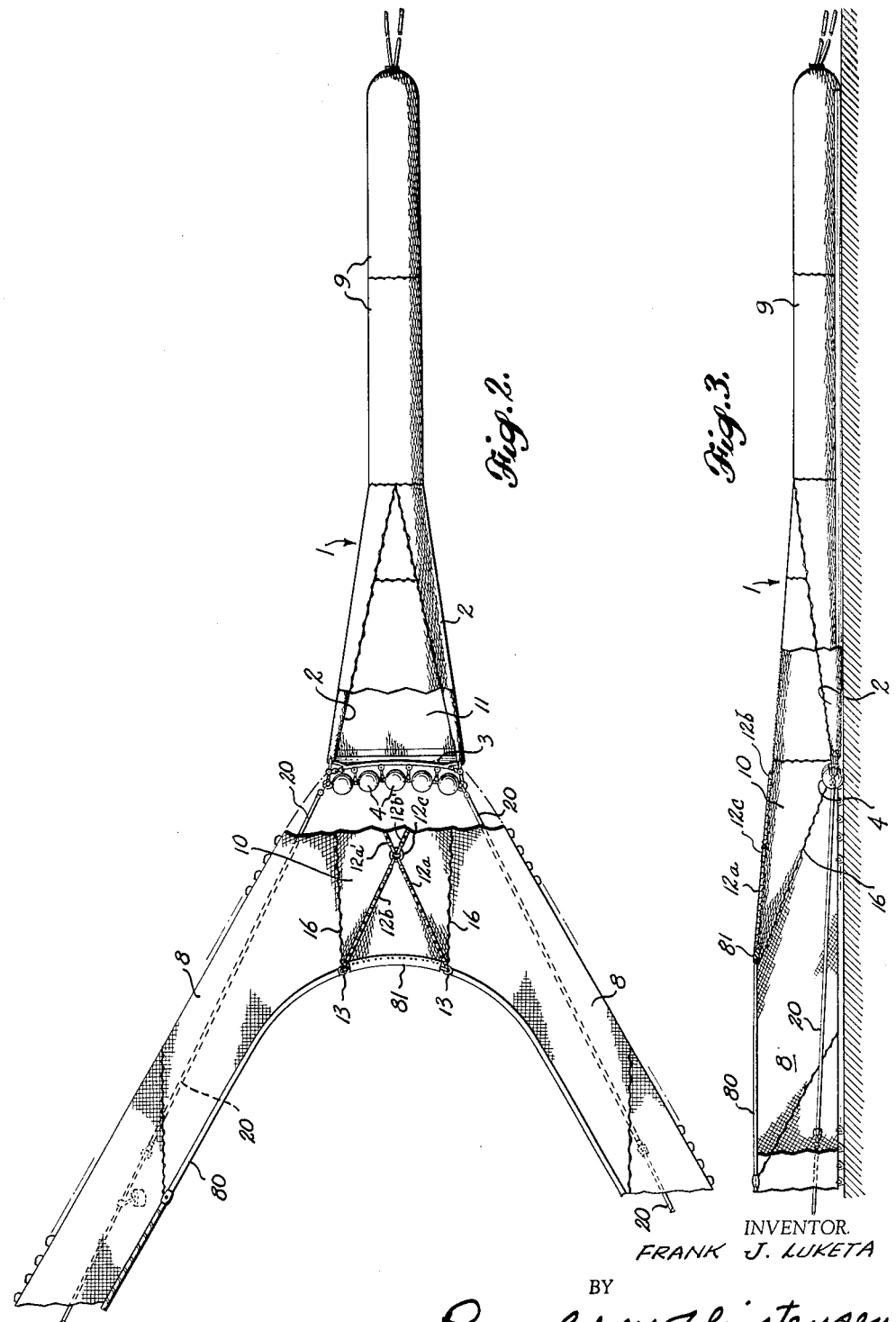

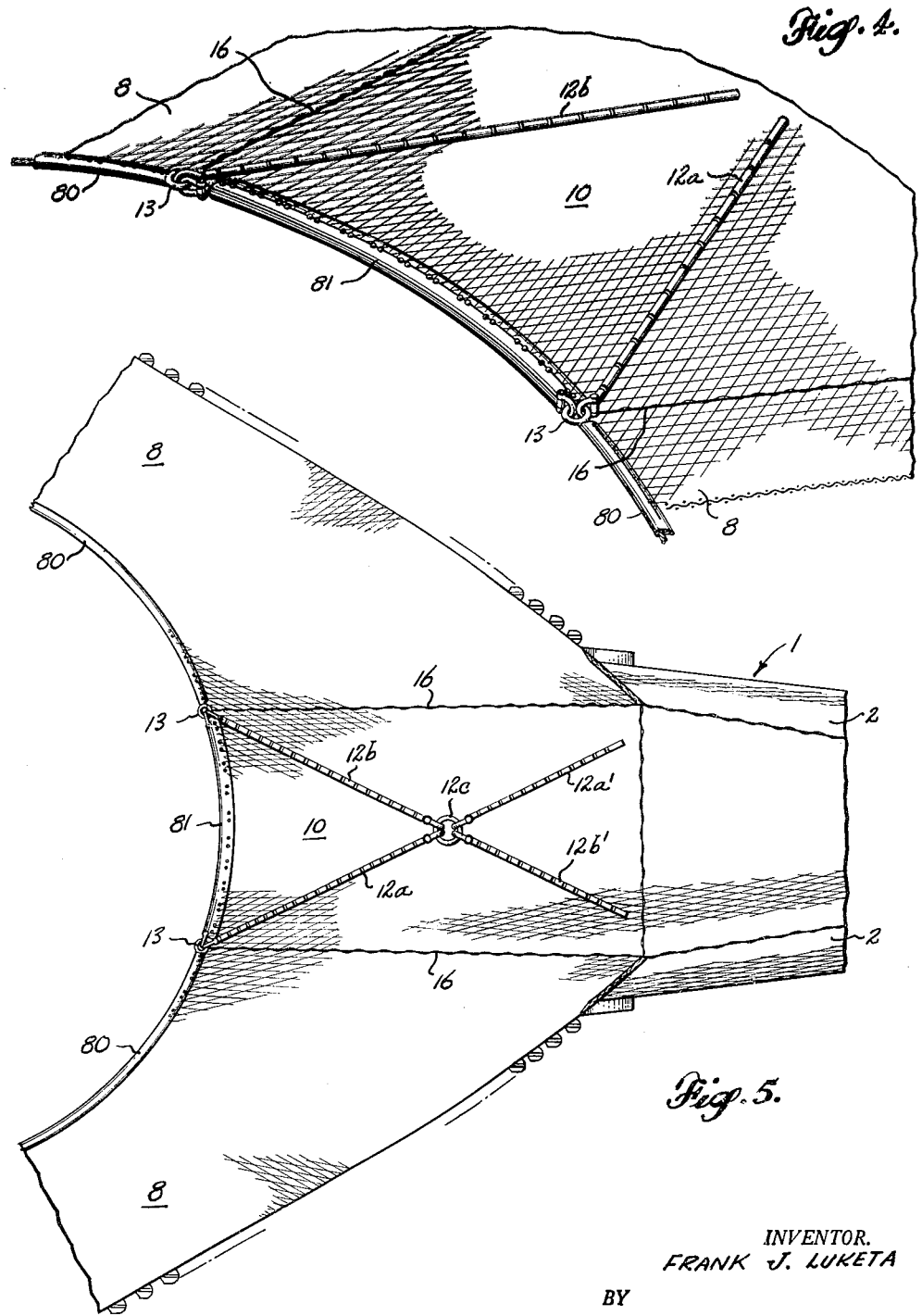

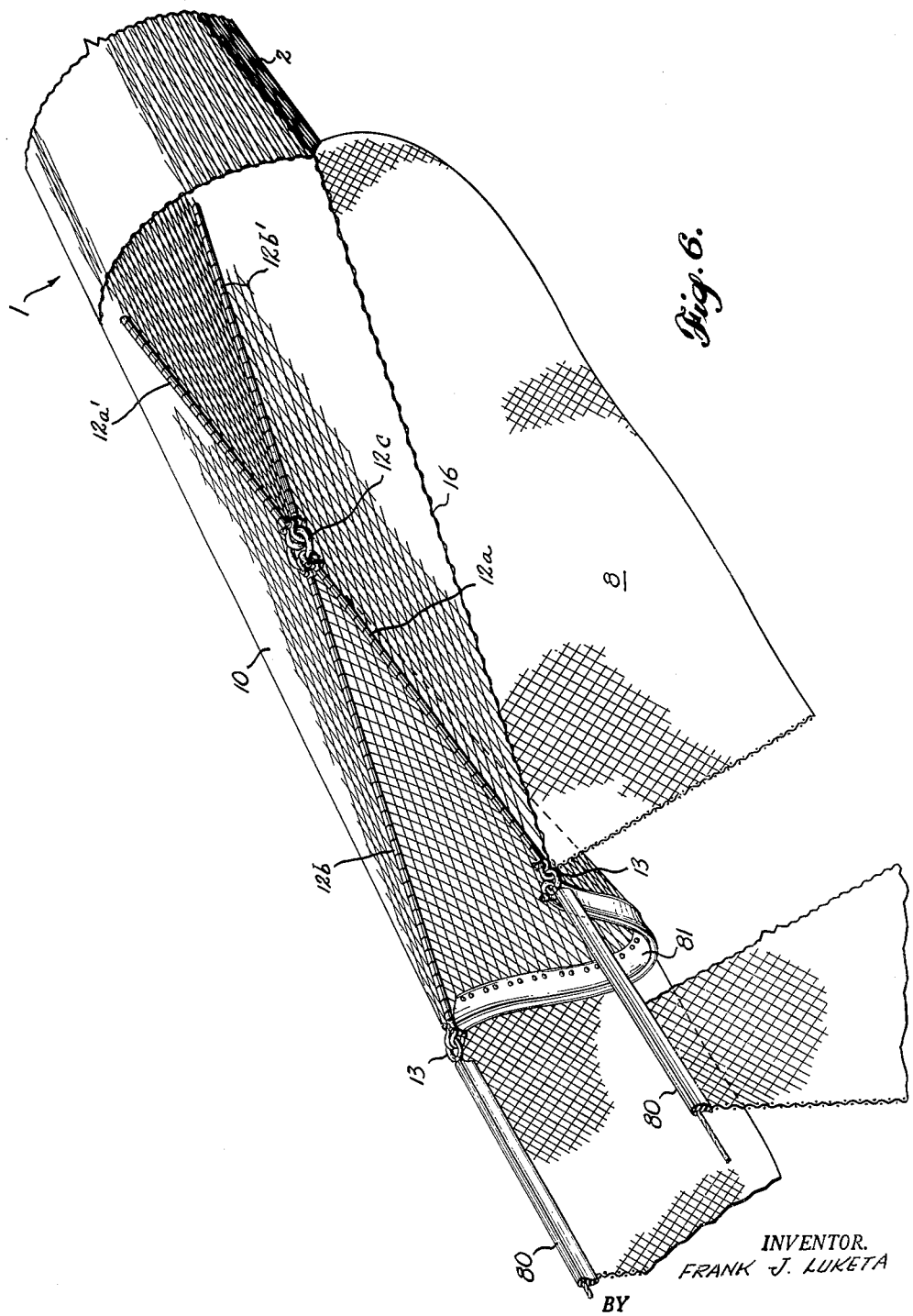

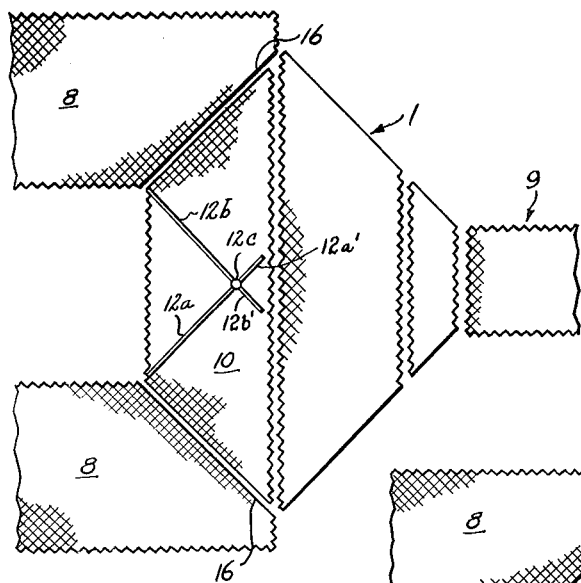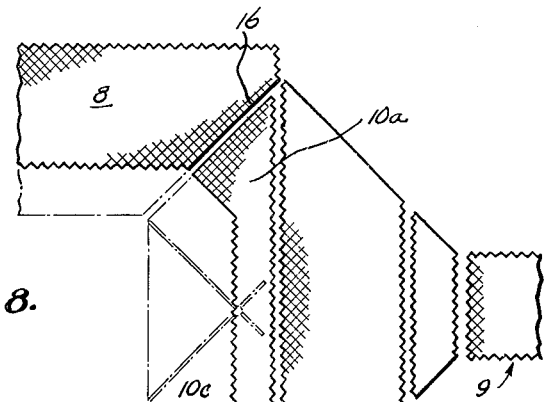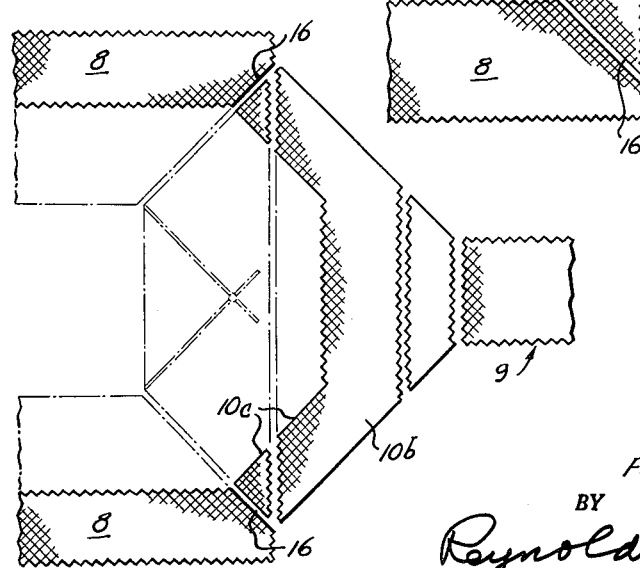

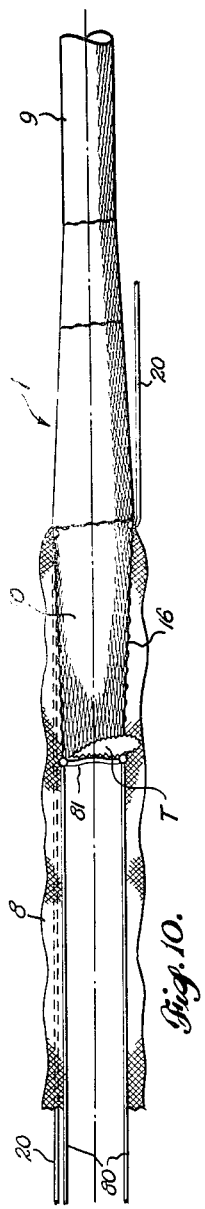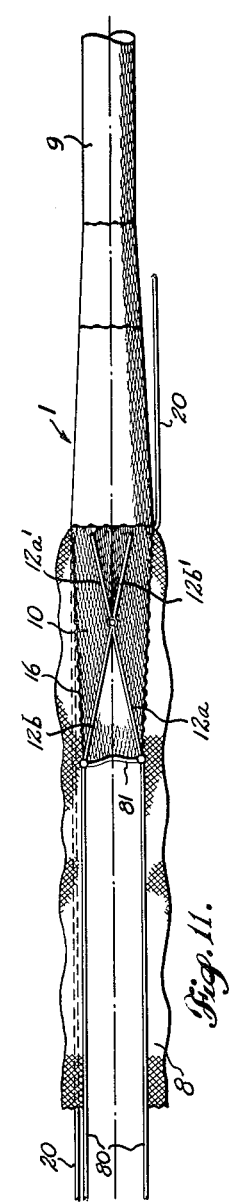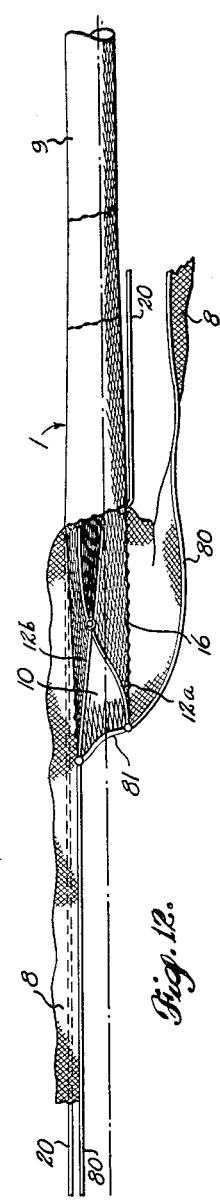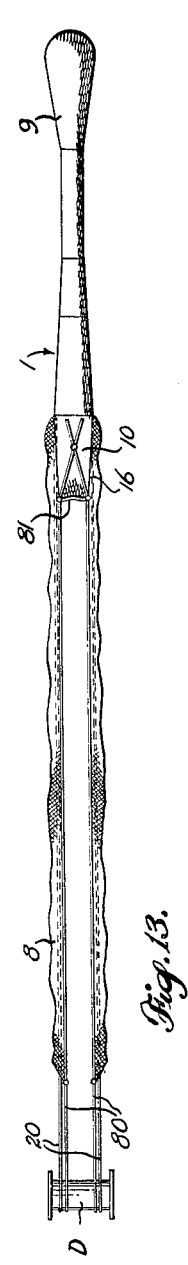

Sept. 14, 1965 F. J. LUKETA 3,205,605
REINFORCEMENT FOR PANEL PORTIONS OF A TRAWL NET
Filed Jan. 17, 1963 7 Sheets-Sheet 7

INVENTOR.
FRANK J. LUKETA
BY
Reynolds & Christensen
ATTORNEYS

United States Patent Office 3,205,605
Patented Sept. 14, 1965

3,205,605
REINFORCEMENT FOR PANEL PORTIONS OF A TRAWL NET
Frank J. Luketa, 5567 Greenwood Ave., Seattle, Wash.
Filed Jan. 17, 1963, Ser. No. 252,193
11 Claims. (Cl. 43—9)

The present invention relates to the reinforcement of the bosom and funnel portions of trawl nets, and more particularly to reinforcement line means especially adapted to be inactive and relatively non-stressed when the trawl net is functioning normally during trawling, but to become active and be substantially stressed during abnormal conditions and during hauling of the net.

In the design of trawl nets, which are largely of mesh, rather appreciable care is taken to use a twine size and to orient the meshes in such manner that highly stressed elements have their straight twine direction in the direction of the stress, which tends to distribute stress throughout the mesh. Lines of various sorts are attached to mesh edges, at the bosoms, for example, to transmit the stress from sweep lines and curtain lines whereon the drag is concentrated, evenly to the meshes, so that no stress is so greatly concentrated upon any given individual mesh as to be likely to rupture or tear it. If a tear were to start because of undue concentration of stress upon a single mesh, it would be likely to run indefinitely, for succeeding meshes have not the strength to resist such a concentrated stress, which becomes increasingly concentrated as tearing proceeds. Such a tear could result in the loss of valuable gear, and of the catch, and would surely cause much damage to the net, and impose heavier stress on other parts not designed to assume the same.

Nevertheless, occasionally through accident or improper or careless handling of the gear such over-heavy stresses do occur, particularly at the bosoms of the net. The lower bosom, particularly in a bottom trawl net of my design, is strengthened by a suspension sheet of tough material which I prefer to use between the sweep lines and the mesh, but the upper bosom is vulnerable, and it is a primary object of this invention to reinforce this upper bosom, to guard against extension of a tear, if a mesh at the bosom should be ruptured, and even to afford adequate strength to permit hauling of the net in the event that one or even more of the lines by which the net is dragged, and hauled, should break as a result, for instance, of becoming snagged on a bottom obstruction. The invention is also useful to resist extra stresses sometimes prevalent during normal use of the net.

While the above refers to a bottom trawl net and to the upper bosom thereof, and while the invention will be described in conjunction with a bottom trawl net, the invention could be applied equally well to a midwater trawl net, for there the lower bosom is of much the same construction and rigging as the upper bosom, or in general, to any net or either bosom of a net which might be subject to rupture from a heavy pull.

In the accompanying drawings the invention is shown in presently preferred forms.

FIGURE 1 is an isometric view, partly broken away, of a bottom trawl net incorporating the reinforcements of this invention, and illustrating the relation of the same to other parts of the net.

FIGURE 2 is a plan view, and FIGURE 3 a side elevational view, each broken away in part, illustrating the same net.

FIGURE 4 is an enlarged isometric view, and FIGURE 5 is a top plan view, of the upper bosom and funnel overhang alone, incorporating this invention.

FIGURE 6 is an isometric view of the funnel overhang and the upper bosom, illustrating how the reinforcement is advantageous even in the absence of a tear.

FIGURES 7, 8 and 9 are mesh panel layouts of the upper bosom portion of nets of different designs, illustrating by comparison how the present invention increases the strength and enables the use of a net of a design first disclosed in my companion application on a Trawl Net Panel Construction, Serial No. 253,649, filed on January 24, 1963.

FIGURE 10 is a plan view of a net which lacks the reinforcement of this invention, under a condition that tends to tear it across the upper bosom, and FIGURE 11 is a similar view of a net which incorporates this invention, under like conditions.

FIGURE 12 is a plan view similar to FIGURE 11, showing the net subjected to even more severely concentrated stress, and illustrating the resistance to tearing afforded by this invention.

FIGURE 13 is a plan view of a net incorporating this invention, and the hauling gear for the same, showing the advantage of this invention under normal circumstances.

Figure 14:
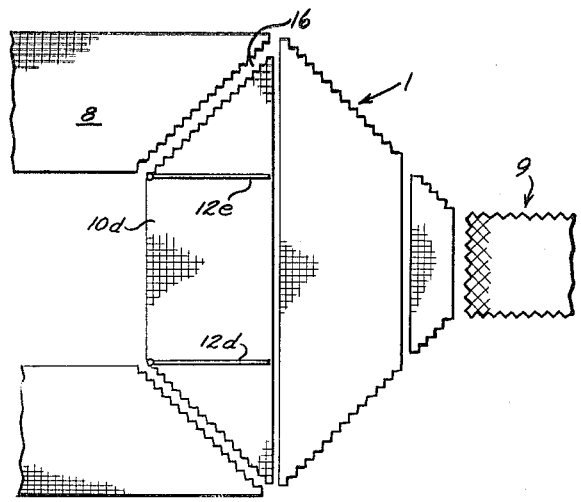
FIGURE 14 is a mesh panel layout similar to FIGURE 7, but showing the principle of the invention incorporated in a net which is bar-cut across the upper bosom.

Referring first to FIGURES 1, 2 and 3, the bottom trawl net disclosed by way of illustration, includes a funnel 1 flaring forwardly from the open forward end of a cod end 9, the net being dragged forwardly primarily by two sweep lines 20 that connect to the forward points of respective mesh suspenders 2 that at their after ends are distributed part-way about and are secured to the forward end of the cod end, where the funnel joins the cod end. The suspenders are in effect parts of the funnel. Their function is to transmit and distribute the drag of the sweep lines 20 to and about the cod end, and so to relieve the other parts of the funnel of this primary load. The overhanging mesh panel 10 of the funnel has a point-cut forward edge and a bosom line 81 secured to the forward points of such forward edge. Curtain lines 80 extend forwardly at each side from the termini of the bosom line 81, and curtains 8 are suspended from the respective curtain lines, so that their lower edges sweep the ocean bottom. The rear edges of the two curtains are joined, along the lines 16, to the side edges of mesh panel 10. The lines 20 and 80 extend forwardly at each side to connect to a door 5, which is dragged ahead by a towing warp 50 from the trawler. The curtain lines are thus stressed somewhat, even though the primary stress is upon the sweep lines 20, especially when hauling in the trawl. The lower bosom is defined by a suspension bar 3, of tough, substantially inelastic material, secured to the laterally gathered mesh panel 11 of the funnel's bottom, which also has its straight-twine direction fore-and-aft. The suspension bar connects at its outer forward corners to the sweep lines 20, and transmits their drag to the bottom of the funnel. The construction may be such as is disclosed in my companion application Serial No. 249,265, filed on January 3, 1963, entitled Lower Bosom Suspension for Trawl Nets. Rolling bobbins 4 support the lower bosom slightly above the ocean bottom. The net of this form, lay-out, and rigging is not itself part of the present invention, but this invention is concerned with the reinforcement of this net in particular, and especially of the mesh panel 10 thereof, which is not intended to be highly stressed in normal use, but may become highly stressed under conditions which can be considered abnormal. Reinforced according to the present invention such a panel lay-out becomes feasible.

According to this invention reinforcing lines such as cables covered with rubber circumferentially grooved, designated 12a, 12a' and 12b, 12b', beginning at 13 at the bosom line 81 where the lacing lines 16 begin, and where the curtain lines 80 connect, are secured, as by lacing at frequent intervals, or otherwise, in mutually intersecting relation, to the mesh panel 10. They may not even meet, at point 12c, or they may merely meet there, but preferably they meet and extend past such point to a distance to include substantially the entire length of the panel 10, or they could be even longer. Panel 10 is oriented in a manner such that its meshes tend to elongate in the fore-and-aft direction when stressed, the reinforcing lines 12a, 12a', and 12b, 12b' preferably lie along bars of the mesh, as is made clear in FIGURES 4 and 5. The lines of lacing at 16 lie along the bars where the forward side edges of panel 10 are cut, (see FIGURE 7) but each such bar at 16 lies at right angles to the nearer reinforcing line 12a, 12a' or 12b, 12b' when the mesh panel 10 is relaxed. Since it is stressed somewhat in use, the bars at 16 and the bar where the nearer reinforcing line is laced appear to form an acute angle in FIGURE 5.

When such a net is hauled by the drum trawling method, somewhat as suggested in FIGURE 13, between upright posts at the stern of the trawler and onto a drum D, the lines 20 and 80 which during trawling are held widely spread by the doors 5 are drawn close together to pass between the posts. The bosoms, and particularly the upper bosom which before was stretched laterally as well as longitudinally by the outward pull of the lines 80, is no longer so stretched, but hangs limply between the points 13; see FIGURE 6. The stress that before was distributed rather evenly to the meshes across the bosom line 81, is now concentrated at these points 13. Under certain conditions, were there nothing more than the meshes across the funnel 1 to assume such concentrated stress, a tear would start and proceed uninterruptedly across the bosom, as at T in FIGURE 10, and there would be the possibility of tearing completely about the funnel as the longer tear imposes increasingly heavy stress on the remaining twine. This could result in complete loss of the cod end and its catch. Even if such an extreme result were avoided, the haul-in of the net would proceed unevenly, loss of some fish would be quite likely, and extensive repair would be required before the net could be used again.

By the use of the reinforcing lines 12a and 12b, placed as described above, such results are prevented. As the lines 80 come into parallelism and change from an abaxial to a substantially coaxial relationship with respect to the reinforcing lines 12a, 12a', 12b, 12b' (see FIG. 6), the upper bosom goes slack, the pull of the lines 80 is transferred to the lines 12a, 12a' and 12b, 12b'. They distribute the stress evenly to each mesh in the length of the mesh bar to which they are connected, throughout the length of the funnel, hence no mesh is overly stressed. The mesh on the aft sides of lines 12a, 12a' and 12b, 12b' is strongly stressed and elongates and crowds together laterally; in so doing it transmits the pull on lines 80 to the remainder of the funnel. It will be remembered that the load on the lines 80 during trawling is that required to distend and drag forwardly the funnel and the curtains for the load of the cod end and its catch is assumed by the sweep lines 20. It is during hauling that the meshes of the funnel may be more greatly stressed.

This then is the manner in which the reinforcing lines function during normal use. They have an equally important function in the event of a break or other abnormal event, if indeed this further function is not more important. Some such abnormal functioning is suggested in FIGURES 10, 11 and 12.

In FIGURE 10 the net is shown without the reinforcing lines of this invention. Let it be assumed that a sweep line 20, for instance, on the port side of the net, has broken; the end of such a broken line is shown steaming aft in FIGURE 11. Immediately the break occurs the load which that port sweep line has assumed it transferred to the port curtain line 80, primarily. The load is greater than the funnel, at its upper bosom, is designed to bear; a tear T starts, and there being nothing to limit it it may extend to an indeterminate distance about the funnel, feeding upon its increasing weakness. But should such an accident occur in a net which incorporates the reinforcing lines 12a, 12a' and 12b, 12b' as in FIGURE 11, the added load on the upper panel 10, concentrated at 13, is transmitted directly to the line 12a, 12a', and is by that line distributed throughout the meshes of panel 10. There is no possibility that a hauling stress induced tear will commence. However, if a tear should be incurred by a snag the lines 12a, 12a' and 12b, 12b' further serve to resist its running past them and thereby limit the damage. Even if, say, the portside curtain line 80, in addition to the portside sweep line 20, should break, as in FIGURE 12, the starboard reinforcing line would transmit the stress to and distribute it throughout the mesh of panel 10 sufficiently well to avoid danger of further breakage. Here, while the reinforcing line 12a, 12a' goes slack, the line 12b, 12b' transmits the stress to the mesh of the funnel to which it is laced sufficiently evenly to prevent further breakage or tears, and to transmit that stress to the stronger meshes of the cod end.

The present invention is especially designed to reinforce a net having a top of generally diamond shape, truncated straight across its forward peak, such a net being advantageous as compared to indented tops, in the manner and, for reasons set forth in my aforesaid application Serial No. 253,649. In nets wherein the top 10a (FIGURE 8) or 10b (FIGURE 9) is indented to define the upper bosom, the bar-cut side edges 10c were intended to assume the pull of the curtain lines, but there was no such possibility of distribution of stress to all the mesh as there is according to the present invention. Moreover, these former designs severely limited the height of the curtains, as can be seen by comparison of the present design, shown in dot-dash lines in FIGURES 8 and 9 (and in full lines in FIGURE 7), with the former designs shown in full lines in FIGURES 8 and 9.

The invention has been illustrated as incorporated in a bottom trawl net, and as associated with the forward mesh panel of its top. In a midwater trawl net the bottom of the funnel is substantially of the same design as its top. It follows that the present invention will be useful if incorporated also in the bottom of a midwater trawl net. Also, in nets wherein the bottom of the funnel is inherently strong, incorporating a nonmesh element at its lower bosom, there is no particular need for this invention at its bottom, but if the bottom is of mesh, and possibly subject to tears, the present invention could be well used to advantage in its bottom. Even though reference is made in the claims to the funnel's top, this is not intended to be limiting, in cases such as the above, and the language is to be read in the general sense, unless the contrary clearly appears. As used herein the expression "suspension lines means" includes both the upper (e.g. "float lines," "head ropes," and "curtain lines") and lower (e.g. "ground lines," "foot ropes," and "sweep lines") sets of main net lines, to which the netting is attached and/or which carry the drag. The bosom line 81 is a part of the suspension line means.

Although the reinforcing lines are shown in the drawings and described above as preferably secured along a bar they could be secured along a taper forward or aft of the bar, on one of various angles projecting from their anchorage at point 13. Such a location is to be understood as within the intention of the claims.

The reinforcing lines have been described above as running along bars that extend diagonally from the ends of a point-cut bosom. If the panels should be so laid out that the bosom is bar-cut, the invention could still be employed to advantage. Such a layout is shown in FIGURE 14. Here the panel 10d is bar-cut across the bosom, and the bars of the panel are oriented transversely and fore-and-aft. The reinforcing lines 12d and 12e are each secured at frequent intervals along a fore-and-aft bar from the respective ends of the bosom, where the curtain line 80 or a sweep line is secured. In the event of parting of one such line the drag of the other is imposed upon the reinforcing line that it is in effect its extension, and by the reinforcing line is distributed to the mesh of panel 10d.

Figure 15:
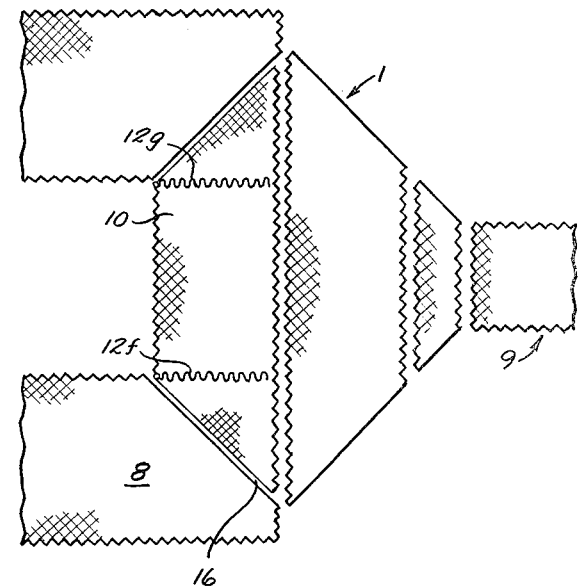
FIGURE 15 is also a mesh panel layout similar to FIGURE 7, and like FIGURE 7 showing a point-cut upper bosom, but showing a modified type of reinforcement.

Similar orientation of the reinforcing lines, namely, fore-and-aft rather than diagonally and across, can be effected even if the bosom be point-cut and its bars run diagonally. FIGURE 15 shows this capability. The reinforcing lines 12f, 12g are sinuous, following two sides of each mesh square, and secured to these mesh squares at close intervals. Now if a heavy drag is imposed at one end of the bosom, the mesh will elongate and the reinforcing line, 12f for example, will straighten out. Although it would ordinarily be so secured to the twine of the mesh squares that it would be straightened and heavily tensioned before the mesh squares are quite fully elongated, even if both the line 12f and the twine of the mesh squares were tensioned alike, they would mutually reinforce each other.

I claim as my invention:

1. In a trawl net including a panel of netting having a transverse forward edge, suspension line means extending across and diverging forwardly from said forward edge, means securing said suspension line means to said forward edge, reinforcing line means including at least one reinforcing line secured at its forward end to said suspension line means, in the vicinity of said forward edge, and extending aft therefrom along interconnected sides of a series of mesh squares of the panel arranged in a straight line pattern, and means plurally securing said reinforcing line to the meshes of said netting, said reinforcing line means being disposed to be relatively non-stressed when the trawl net is functioning normally during trawling, but becoming substantially stressed during hauling of the net and in the event of a break in said suspension line means.

2. The combination of claim 1, wherein the reinforcing line extends generally sinuously, and is of a length approximating the length of the mesh squares which it traverses, when the latter are fully elongated.

3. The combination of claim 1, wherein the panel of netting is oriented with its points aligned across the forward edge, and the reinforcing line means consists of two reinforcing lines, each of which is directed aft along, and is secured at close intervals to, one of a pair of bars of the netting which lead from the forward edge of the netting and intersect generally centrally of the panel of netting.

4. The combination of claim 3, wherein the reinforcing lines extend aft at least to the point of intersection of said pair of mesh bars.

5. In combination with a mesh panel of a trawl net which has a generally transverse forward edge, two forwardly directed lines secured to the respective termini of the forward edge, to drag the same forwardly, reinforcing lines directed aft from the vicinity of the points of securement of the forwardly directed lines to the forward edge, said mesh panel being oriented with its points aligned across the forward edge, and said reinforcing lines being two in number, each directed aft along, and each secured at close intervals to, respective bars of the mesh panel converge and intersect aft of the forward edge, said reinforcing lines crossing at the point of intersection and extending farther aft along the same mesh bars.

6. The combination of claim 1, wherein the panel of netting is bar-cut across its forward edge, and the reinforcing line means consists of two lines, each directed aft along, and each secured at close intervals to, respective bars of the netting, which bars extend directly aft from the ends of the forward edge.

7. The combination of claim 1, wherein the netting which makes up the panel is point-cut across its forward edge, and said reinforcing line means including a reinforcing line extending generally sinuously along two sides of successive mesh squares, aft of each end of the forward edge, and is secured thereto at close intervals, each such reinforcing line being of a length substantially as long as the cumulative length of such two sides of the several mesh squares.

8. In combination with the mesh panel of a trawl net top panel having a transverse edge point-cut, and oriented with its mesh bars crossing aft of the transverse edge, a bosom line secured along such point-cut edge, two curtain lines directed forwardly from the respective termini of the bosom line, a curtain depending from each curtain line and being integrally connected to and extending forwardly of said top panel, and two reinforcing lines secured also to the curtain line in the vicinity of said respective termini of the bosom line, and converging aft each substantially along a bar of the top panel, and each secured at close intervals to said panel.

9. In combination with the mesh panel of a trawl net top panel which has a generally transverse point-cut forward edge, and is oriented with its mesh bars crossing aft of the forward edge, a bosom line secured along such forward edge, two curtain lines directed forwardly from the respective termini of the bosom line, and two reinforcing lines secured also to the curtain line in the vicinity of said respective termini of the bosom line, and converging aft each along a bar of the top panel, and each secured at close intervals to its bar, said reinforcing lines and the top mesh panel each being of a length to extend past the point where the reinforcing lines converge, said reinforcing lines crossing at such point and continuing aft along and secured to the same mesh bars as before.

10. A trawl net having suspension line means including a generally transverse bosom line and lines diverging forwardly from said bosom line, netting attached to and trailing aft and laterally of said suspension line means, wherein during normal trawling the suspension line means are in tension and the meshes of said netting in the vicinity of the bosom line are substantially uniformly distended and substantially uniformly stressed and the suspension line means is pulled by the drag forces acting on the netting into a substantially rounded arch configuration, and wherein on other occasions, including during hauling of the net and when a part of the suspension line means breaks forwardly of the bosom line, the substantially rounded arch configuration of the suspension line means and the substantially uniformly distended and substantially uniformly stressed conditions of the netting are lost, and the towing stresses become concentrated on certain meshes of the netting, in regions thereof extending from and aft of the bosom line in a generally straight line pattern; and reinforcement line means secured at close intervals substantially along the bars of the net meshes in the regions of the netting wherein the towing stresses are concentrated during said occasions of use other than normal trawling, said reinforcement line means extending aft from the vicinity of said bosom line and being disposed so as to be substantially inactive and unstressed during normal trawling, but becoming active and serving to distribute the towing stresses substantially evenly along the plurality of net meshes to which it is secured during those occasions when the towing stresses are not uniformly distributed but rather are concentrated.

11. A trawl net having a net body including a cod end and a panel of netting forwardly of the cod end; a first set of forwardly diverging lines leading from said net body and carrying a portion of the net load during normal net operation, a second set of forwardly diverging lines led forwardly of the said panel of netting and carrying a portion of the net load during normal net operation, and reinforcing line means secured at close intervals to the meshes of said panel of netting and connecting with said second set of diverging lines to the funnel, said reinforcing line means being arranged along the interconnected sides of a series of mesh squares of the panel arranged in straight line pattern and in abaxial relation with said second set of lines during normal net operation, but to assume a substantially coaxial attitude with respect to at least one of said second set of lines and to generally equally distribute the load of the net to the meshes of the panel of netting in the event one or both of said second set of lines should bear a greater than normal portion of the net load, as in the case when one or both of said first set of lines should part.

References Cited by the Examiner

UNITED STATES PATENTS

| | | | |
|---|---|---|---|
| 1,867,281 | 7/32 | Runkle | 43—9 |
| 2,081,146 | 5/37 | Herrington | 43—9 |

FOREIGN PATENTS

| | | |
|---|---|---|
| 7,862 | 1903 | Great Britain. |
| 163,388 | 5/21 | Great Britain. |
| 79,343 | 5/55 | Netherlands. |

OTHER REFERENCES

Gourock: Deep Sea Trawling and Wing Trawling, page 22, published 1956 by the Gourock Ropework Co., Ltd., Port Glasgow, Scotland.

Modern Fishing Gear of the World, page 172, published 1959 by Fishing News, London, England.

ABRAHAM G. STONE, *Primary Examiner.*

F. RAY CHAPPELL, *Examiner.*